US008239289B2

(12) United States Patent
Land et al.

(10) Patent No.: US 8,239,289 B2
(45) Date of Patent: Aug. 7, 2012

(54) INTER-GALLERY TRADING SYSTEM FOR ARTWORKS

(76) Inventors: Kris Land, Poway, CA (US); Daniel L S J Gervis, Paris (FR); Jean-Michel Melemedjian de Rus, Paris (FR)

(*) Notice: Subject to any disclaimer, the term of this patent is extended or adjusted under 35 U.S.C. 154(b) by 251 days.

(21) Appl. No.: 12/478,486

(22) Filed: Jun. 4, 2009

(65) Prior Publication Data

US 2010/0312671 A1 Dec. 9, 2010

(51) Int. Cl.
*G06Q 10/00* (2012.01)
*G06Q 30/00* (2012.01)
*G06Q 40/00* (2012.01)

(52) U.S. Cl. ......... 705/27.1; 705/1.1; 705/26.1; 705/35; 705/37

(58) Field of Classification Search ................ None
See application file for complete search history.

(56) References Cited

U.S. PATENT DOCUMENTS

| | | | |
|---|---|---|---|
| 6,041,310 A | 3/2000 | Green et al. | |
| 6,085,176 A | 7/2000 | Woolston | |
| 6,339,763 B1 | 1/2002 | Divine et al. | |
| 6,983,371 B1 | 1/2006 | Hurtado et al. | |
| 7,209,602 B2 | 4/2007 | Kim | |
| 7,321,873 B2 * | 1/2008 | Reuter et al. | 705/37 |
| 7,451,107 B1 | 11/2008 | Chvala et al. | |
| 7,680,715 B2 * | 3/2010 | Waelbroeck et al. | 705/35 |
| 7,693,896 B1 * | 4/2010 | Raines | 707/706 |
| 2002/0070982 A1 | 6/2002 | Hill et al. | |
| 2002/0116275 A1 | 8/2002 | Woolston | |
| 2002/0141584 A1 | 10/2002 | Razdan et al. | |
| 2003/0065532 A1 * | 4/2003 | Takaoka | 705/1 |
| 2003/0097313 A1 | 5/2003 | Saul et al. | |
| 2003/0223650 A1 | 12/2003 | Kim | |
| 2004/0172280 A1 * | 9/2004 | Fraki et al. | 705/1 |
| 2005/0021423 A1 * | 1/2005 | Nahan et al. | 705/27 |

(Continued)

FOREIGN PATENT DOCUMENTS

JP 2002-041822 A 2/2002

(Continued)

OTHER PUBLICATIONS

"Media Arts Group participates in Exclaim's online B2B trading hub", Business Wire, Jan. 6, 2006, http://findarticles.com/p/articles/mi_m0EIN/is_2000_Jan_6/ai_58472831, 2 pages, printed from the Internet on Mar. 28, 2009.

(Continued)

*Primary Examiner* — Asfand Sheikh
*Assistant Examiner* — Allen Chein
(74) *Attorney, Agent, or Firm* — Chen Yoshimura LLP

(57) ABSTRACT

A clearinghouse system for inter-gallery trading of artworks is described. A central database stores digital images and metadata about artworks owned by all member galleries. The data is duplicated and stored in local databases at each member gallery. Customers at a first gallery can view images and information about artworks owned by other galleries using display devices installed at the first gallery. If the customer is interested in an artwork owned by a second gallery, a price request is transmitted from the display device to a remote clearinghouse management server. The clearinghouse management server transmits the price to the first gallery via an information receiver other than the display device. The first gallery may then quote a price to the customer by adding a markup to the price received from the clearinghouse management server. A purchase request can also be generated from the display device.

13 Claims, 2 Drawing Sheets

U.S. PATENT DOCUMENTS

| | | | |
|---|---|---|---|
| 2005/0177463 | A1 | 8/2005 | Crutchfield et al. |
| 2006/0277113 | A1* | 12/2006 | Richards .................. 705/26 |
| 2007/0011094 | A1 | 1/2007 | Manchala |
| 2007/0024603 | A1 | 2/2007 | Li |
| 2008/0255966 | A1* | 10/2008 | Kopelman et al. ............ 705/27 |
| 2010/0235270 | A1* | 9/2010 | Baker ..................... 705/35 |

FOREIGN PATENT DOCUMENTS

| | | |
|---|---|---|
| JP | 2002-056201 A | 2/2002 |
| JP | 2003-044712 A | 2/2003 |

OTHER PUBLICATIONS

"Original fine art for sale", B2B Fine Art.Com, www.b2bfineart.com, 4 pages, printed from the Internet on Mar. 28, 2009.

"The Electric Gallery", eGallery, www.egallery.com, 2 pages, printed from the Internet on Mar. 28, 2009.

"Inter-gallery art shows gain ground" Economic Times, Jul. 30, 2008, Kolkta, India, http://economictimes.indiatimes.com/Personal_Finance/Art_/Inter-gallery_art_shows_gain_ground/rssarticleshow/3307099.cms, 1 page, printed from the Internet on Mar. 28, 2009.

"Ro Gallery Selected Artworks Online", Ro Gallery www.rogallery.com, 3 pages, printed from the Internet on Mar. 28, 2009.

"Art on the Net: artists sharing art", Art.Net (Art on the Net), www.art.net, 6 pages, printed from the Internet on Mar. 28, 2009.

"Yessy Art Gallery", Yessy Art Gallery, www.yessy.com/overture.html, 7 pages, printed from the Internet on Mar. 28, 2009.

"Fan Art Review", Fan Art Review.com, www.fanartreview.com/index.jsp, 6 pages, printed from the Internet on Mar. 28, 2009.

"Gallery: your photos on your Website", Gallery, http://gallery.menalto.com/features, 13 pages, printed from the Internet on Mar. 28, 2009.

International Search Report and Written Opinion in counterpart PCT application No. PCT/US2010/035693, dated Jul. 15, 2010.

* cited by examiner

INTER-GALLERY TRADING SYSTEM FOR ARTWORKS

BACKGROUND OF THE INVENTION

1. Field of the Invention

This invention relates to a system and method for inter-gallery trading of artworks.

2. Description of the Related Art

Various online systems have been proposed and implemented for dealing in (buying and selling) digital artworks. For example, U.S. Pat. Appl. Pub. 2002/0141584, entitled "Clearinghouse for enabling real-time remote digital rights management, copyright protection and distribution auditing," describes a digital-works clearinghouse: "A digital-works Clearinghouse comprises a database, which stores meta-information relating to digital-works and a server configured to coordinate digital-works transactions, distribution, auditing, tracking, monitoring, advertisement insertion and collection of meta-data of a digital work such that, a digital-work Publisher can remotely monitor a digital work by communicating with the Clearinghouse server regarding the digital work. Furthermore, the digital-works Clearinghouse comprises a software application that is modular and is given to the digital-works Distributor's such that it is responsible for enabling copyright protection, distribution, distribution auditing and communicating with Clearinghouse and other Distributors whereby a Publisher can remotely monitor their digital work." (Abstract.)

U.S. Pat. App. Pub. 2007/0011094, entitled "Tools for accessing digital works", describes apparatus that comprise a user interface, a rendering device, a clearinghouse communicator, and an enable mechanism. The user interface includes a digital work choosing mechanism to choose a digital work for rendering. At least one repository holds digital works and includes the chosen digital work. The rendering device obtains a representation of the chosen digital work from the repository and renders the chosen digital work. A clearinghouse communicator electronically sends rights criteria to a remote clearinghouse and receives rights defining information from the clearinghouse. The enable mechanism enables the rendering device to render the chosen digital work in accordance with the rights defining information.

Numerous online resources are also available for buying and selling original fine art. For example, some art galleries and artists have websites allowing users to view images of their artworks and obtain price and other information about the artworks.

SUMMARY OF THE INVENTION

The present invention is directed to a method and system for inter-gallery trading of artworks. It can be more generally applied to trading of other collectible items.

An object of the present invention is to provide a system that facilitates the digital display of artworks owned by one gallery at that gallery or another gallery, and to provide a system for inter-gallery trading of artworks.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a system for managing and trading a plurality of collectible items, which includes: a local database storing digital image data representing the plurality of collectible items and metadata relating to the collectible items; an electronic display device connected to the local database for displaying the digital image data and the metadata, the electronic display device implementing a user interface system for receiving user inputs; a management computer remotely connected to the electronic display device; and a clearinghouse database connected to the management computer for storing price information for the plurality of collectible items; wherein in response to a first user input, the electronic display device transmits a first request to the management computer, the first request being a request for price information for a specified one of the plurality of collectible items, and wherein in response to receiving the first request from the display device, the management computer transmits price information for the specified collectible item to an information receiver other than the electronic display device.

In another aspect, the present invention provides a method for managing and trading a plurality of collectible items, which includes: storing in a local database digital image data representing the plurality of collectible items and metadata relating to the collectible items; displaying the digital images representing the collectible items and the metadata on an electronic display device connected to the local database; in response to a first user input, the electronic display device transmitting a first request to a management computer remotely connected to the electronic display device, the first request being a request for price information for a specified one of the collectible items; storing in a clearinghouse database connected to the management computer price information for each of the plurality of collectible items; and in response to receiving the first request from the display device, the management computer transmitting price information for the specified collectible item to an information receiver other than the electronic display device.

In another aspect, the present invention provides a system for managing and trading a plurality of collectible items, which includes: a local database storing digital image data representing the collectible items and metadata relating to the collectible items; and an electronic display device connected to the local database for displaying the digital image data and the metadata, the electronic display device implementing a user interface system for receiving user inputs, wherein in response to a first user input, the electronic display device transmits a first request to a remote management computer, the first request being a request for price information for a specified one of the collectible items.

In another aspect, the present invention provides a clearinghouse system for managing and trading a plurality of collectible items, which includes: a management computer remotely connected to a plurality of first communication devices; and a clearinghouse database connected to the management computer, the clearinghouse database storing price information for each of the plurality of collectible items, the clearinghouse database further storing information that associates an information receiver with each of a plurality of requesters, the information receiver being different from the first communication devices, wherein in response to receiving a first request from one of the first communication devices, the first request being a request for price information for a specified collectible item, the first request further identifying a requester, the management computer obtains from the clearinghouse database price information for the specified collectible item, obtains from the clearinghouse database information about the information receiver associated with the identified requester, and transmits the price information to the information receiver associated with the identified requester.

It is to be understood that both the foregoing general description and the following detailed description are exemplary and explanatory and are intended to provide further explanation of the invention as claimed.

DETAILED DESCRIPTION OF THE PREFERRED EMBODIMENTS

Embodiments of the present invention provide a system for inter-gallery trading of artworks. The term "artwork" here refers to physical objects of art rather than digital art or digital images of physical objects of art. The primary objective of the inter-gallery trading system is to deal in such artworks, rather than to deal in digital art or rights in digital art. The inter-gallery trading system is primarily a business-to-business system rather than a business-to-customer system.

According to one aspect of the invention, a clearinghouse is created for inter-gallery trading of artworks. A plurality of art galleries, referred to as "member galleries" here, register artworks owned by each gallery with the clearinghouse. Digital images of the artworks are generated, such as by scanning, digital photography, etc., and stored in a central database of the clearinghouse. Other information about the works (referred to as metadata here), such as the type of artwork (oil painting, photograph, etc.), size, date of creation, artist, information about the artist, history of the work, etc. will also be inputted into the central database.

On the premise of each member gallery, large format electronic display devices (preferably touch screen panels) are installed. A copy of the digital image data and metadata stored in the central database is distributed by the clearinghouse to each member gallery and stored on local storage devices (e.g. hard disk drives) connected to the display devices. By using the electronic display devices and the local storage devices, each member gallery is able to access digital images and metadata of all artworks available within the clearinghouse system (i.e. artwork owned by any of the member galleries and registered with the clearinghouse).

When a customer visits a member gallery, a gallery staff can use the display device in the gallery to show the customer artworks available within the clearinghouse system. If the customer is interested in an artwork owned by another member gallery (referred to as a "remote gallery", whereas the gallery the customer is physically visiting is referred to as the "local gallery"), the local gallery can obtain the artwork, or obtain further information about the artwork such as price, from the remote gallery through the clearinghouse.

Figure 1:
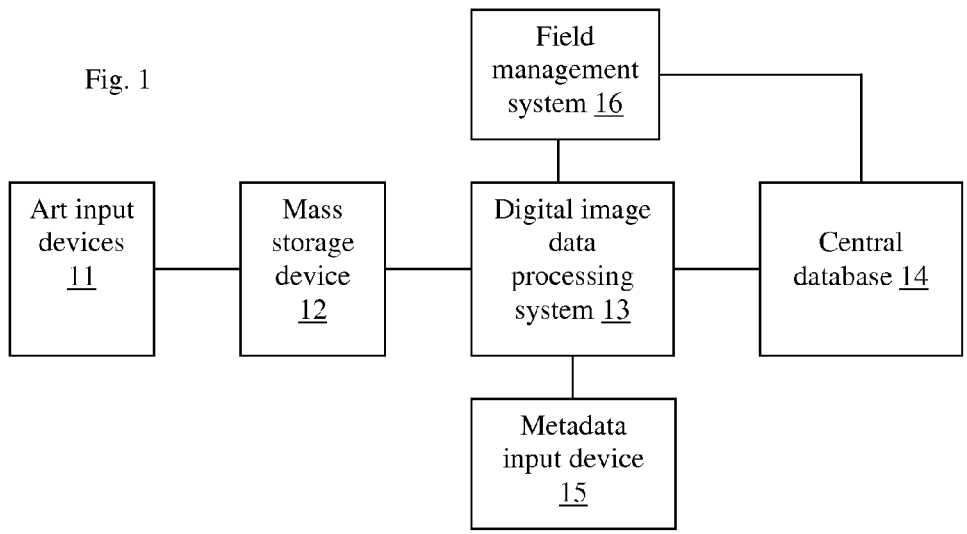
FIG. 1 schematically illustrates a data input system which is a part of a clearinghouse system for trading artworks according to an embodiment of the present invention.

FIG. 1 schematically illustrates a hardware system of the data input portion of the clearinghouse system. One or more art input devices (image capturing devices) 11 are used to generate digital images of artworks. One example of an art input device is a scanner which can scan prints at high resolutions (e.g. 600 dpi). The art input devices 11 may be located at each member gallery or at one or more centralized locations that perform the art input. The digital image data generated by the art input devices 11 is initially stored in mass storage devices 12 as raw image data. The raw image data is processed by a digital image data processing system 13, such as a computer. The processing may include encrypting the data files, adding digital watermarks, generating thumbnail images accompanying the main image, compressing the image data, etc. Suitable image processing techniques are used to generate high quality (e.g. high compression quality, high resolution) images. The processed digital images are ultimately stored in a central database 14.

In conjunction with inputting digital image data of artworks using the art input devices 11, metadata about the artworks is also inputted into the system and ultimately stored in the central database 14. This may be done by using any suitable data input device 15 such as computers connected with the digital image processing system 13. The metadata may be inputted by human operators or automatically. Preferably, the metadata is provided by experts in the fields of art. Optionally, a web-based system may be provided to allow artists to set up accounts to maintain their own profiles including biography, bibliography and other personal or professional information, similar to a social networking system. The information provided by the artists is then incorporated into the metadata stored in the central database 14.

A field management system 16, such as a computer, is connected to the digital image data processing system 13 and the central database 14 and manages the overall process of data input into the clearinghouse system. The field management system 16 is controlled by a human operator. For example, the human operator reviews the digital image data and metadata submitted to the clearinghouse system and accepts or rejects the data. If the data (digital images and accompanying metadata) is accepted, it is stored in the central database 14. If the data is rejected, the operator may request the image to be re-generated by the art input device 11, or the metadata to be revised, etc.

The art input devices 11, the mass storage devices 12, the digital image data processing system 13, the central database 14, the metadata input device 15, and the field management system 16 may form a distributed system where different components are located at different physical locations and connected by a network. Further, the digital image data processing system 13, the metadata input device 15, and the field management system 16 may be implemented by a single computer system that perform the data processing, metadata input and management functions.

Figure 2:
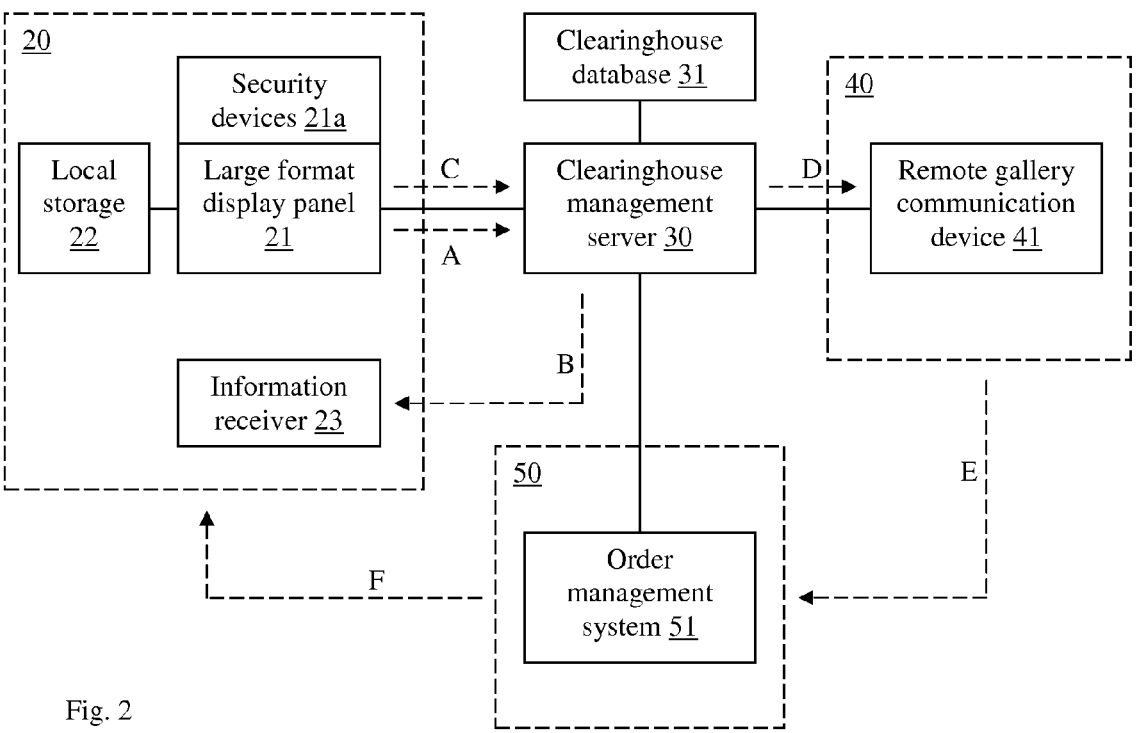
FIG. 2 schematically illustrates various parts of the clearinghouse system for trading artworks according to an embodiment of the present invention.

FIG. 2 schematically illustrates various components of a clearinghouse system. At each member gallery 20, one or more display devices 21 are installed. The display devices 21 are connected to a local storage system 22 (such as hard disk drives) located in the gallery 20, which stores digital images and metadata that are duplicated from the central database 14. The local storage system 22 and the display device 21 may be physically integrated with each other. The data can be distributed form the central database 14 to the plurality of local storage devices using any suitable distribution method, and the data is updated from time to time. If the image data is encrypted and/or has digital watermarks added, the digital keys necessary to decrypt the image data and remove watermarks are supplied to the display device 21 so that the images can be correctly displayed. Alternatively, the local storage system 22 is not provided, but the display device 21 is connected to the central database 14 via a fast network connection. As another alternative, the local storage system 22 stores some but not all content of the central database 14. For example, the local storage system may store a subset of more frequently view images and data, or it may cache a certain amount of most recently viewed images and data.

The display devices 21 are preferably large format (e.g. 32-inch, 47-inch, etc.) touch screen panels. They are controlled by software which provides a user interface (UI) allowing the user to interact with the display devices 21 in a convenient and easy-to-use manner. In one example, the display device implements a graphical user interface using the touch screen as a user input device. The UI allows the user to display an image of an artwork stored on the local storage system 22, enlarge or reduce the image (i.e. zoom in or out), move around in the image, and search and display information (metadata) about the work. As mentioned before, the image data in the database are high quality and high resolution, so that the images displayed on the screen have high quality after enlargement. The UI also allows the user to search for artworks available within the clearinghouse system using various search criteria, such as the artist, the style of work, etc. In addition, the display device 21 can be use to do further research on artworks, artists, etc. The users can have the research result sent to them in electronic forms such as email, facsimile, etc. The UI of the display device 21 also allows art portfolios to be created for individual customers. Each portfolio may include a list of artworks, a set of search criteria, etc. The portfolio may be stored in the local storage device 22 or in the display 21. The portfolios can be used to assist the customers in viewing images of artworks.

Because the data stored in the local storage system 22 include images of artwork owned by all member galleries of the clearing house system, the display device 21 allows artworks owned by one gallery (the remote gallery) to be viewed by customers who physically visit another gallery (the local gallery).

Each touch screen display device 21 preferably has one or more security devices 21a connected thereto, such as a digital card reader, a biometrics reader, etc. The card reader may be a magnetic card reader, smart card reader, chip (contact or no contact) card reader, etc. The biometrics reader may be a fingerprint reader (or any other biometric tool). The security devices 21a can be used to implement an access control system for the display device 21. For example, an exemplary access control system may require a user (such as a gallery staff) to both present a card to the card reader and scan his fingerprint using the fingerprint reader in order to gain access to the display device 21. As an anti-theft measure, an internal GPS system may be provided for tracking a working display device 21 or tracking a stolen display device that has been turned on. Other suitable security measures may be used.

The display device 21 is connected to a clearinghouse management server 30 of the clearinghouse system by a communication line such as a network. Using the communication line, a user may transmit various requests from the display device 21 to the clearinghouse management server 30. The clearinghouse management server 30 responds to the various requests in appropriate manners as described in more detail below. A method of conducting inter-gallery trading using the display device 21 and the clearinghouse management server 30 is described below with reference to FIGS. 2 and 3.

At the local gallery 20, a gallery staff will assist the customers in obtaining information using the display device 21. The gallery staff logs onto the display device 21 using the access control system (step S31). With the assistance of the gallery staff, the customer views images of artworks stored in the local storage system 22, searches for artwork, etc. (step S32). If the customer has an art portfolio created for him, the portfolio can be used to view images of artworks in this step. If a customer is interested in a particular artwork that is available within the clearinghouse system (but is not owned by the local gallery), the gallery staff generates a price request and transmits it to the clearinghouse management server 30 using the display device 21 (step S33). The price request identifies the artwork of interest as well as the requester. The requester may be identified by a user ID of the local gallery staff (e.g. the user ID he used to log on to the display device), an ID of the display device 21 from which the request is transmitted, an ID of the local gallery as a member of the clearinghouse system, etc.

Referring to FIG. 2, the clearinghouse management server 30 is connected to a clearinghouse database 31, which stores price information for each artwork within the clearinghouse system. The clearinghouse database 31 also stores information identifying the sources of the artworks, i.e., which gallery owns each artwork in the clearinghouse system. The price information is provided by member galleries for artworks that they register with the clearinghouse, and represents prices asked for by the member galleries that own the artworks. To facilitate the communication of requests and responses between the display devices 21 and the clearinghouse management server 30, the local storage system 22 and the clearinghouse database 31 use the same identifying information to identify the artworks. In should be noted that the clearinghouse database 31 does not need to store the digital image data or metadata for the artworks.

Figure 3:
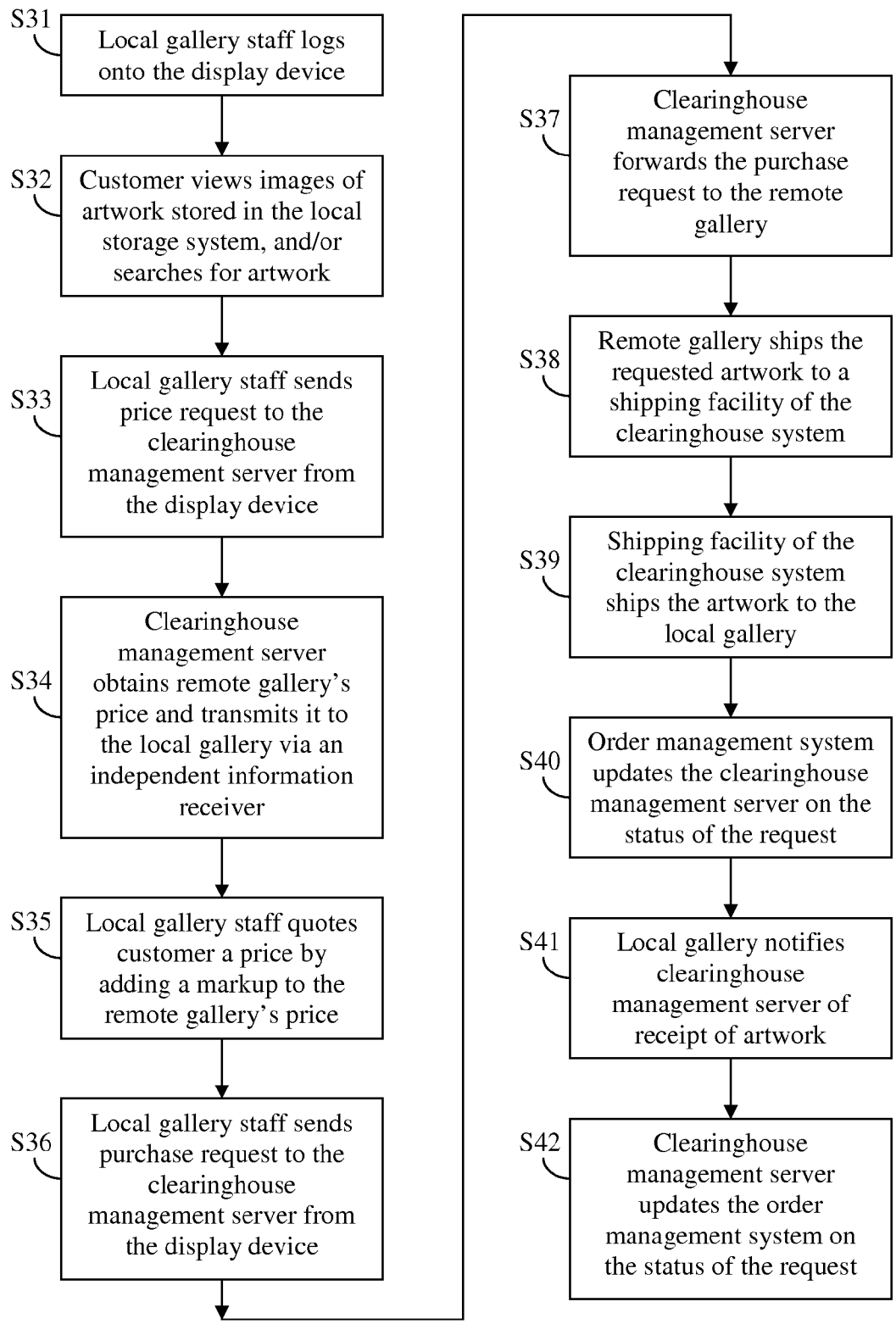
FIG. 3 is a flow chart illustrating a method of inter-gallery trading of artworks.

Referring to FIG. 3, when the clearinghouse management server 30 receives a price request from the display device 21, it automatically retrieves the price information for the artwork of interest from the clearinghouse database 31 and transmits the price information to an independent information receiver 23 that is associated with the requester (step S34). For this purpose, the clearinghouse management server 30 maintains a database that associates one or more information receiver with each requester. The information receiver 23, which is accessible by the local gallery staff but is independent of the display device 21, may be an email account, a telephone number, a facsimile number, a mobile phone, mobile email device, other mobile communication device, land based telephone, facsimile machine, computer, etc. The price information may be transmitted by text messages, email, voicemail, facsimile, etc. It is noted that the price information is not transmitted to the display device 21 itself. In FIG. 2, the transmission of the price request is indicated by the arrow A and the transmission of the price information is indicated by the arrow B.

After obtaining the remote gallery's price via the independent information receiver 23, the local gallery staff can quote a price to the customer accordingly, for example, by adding a markup to the remote gallery's price received from the clearinghouse management server 30 (step S35).

In an alternative implementation, the clearinghouse database 31 may not store the price information for all artwork. When the clearinghouse management server 30 receives a price request and the requested price information is not stored in the clearinghouse database 31, clearinghouse management server 30 obtains the price information from the gallery that owns the work and transmits it to the local gallery 20 via the independent information receiver 23.

It should be noted that while the clearinghouse database 31 stores information about which member gallery owns which artwork within the clearinghouse system, staff of the member galleries themselves do not have that information and the information is not displayed on the display devices 21, with the exception that if an artwork is owned by the local gallery where the display 21 is located, an indication may be displayed on the display device to indicate this fact. Artworks owned by the local gallery are handled differently and no price requests or purchase requests would be necessary.

If the customer desires to purchase an artwork available within the clearinghouse system, the local gallery staff generates a purchase request and transmits it to the clearinghouse management server 30 using the display device 21 (step S36). The purchase request identifies the artwork of interest and the local gallery making the request. The clearinghouse management server 30 performs financial clearing and forwards the purchase request to the remote gallery that owns the art (step S37). In this step, the clearinghouse management server 30 calculates the various payment amounts between parties, including commissions, etc, and verifies the payment methods such as bank accounts, etc. The forwarding of the purchase request is preferably done automatically by the clearinghouse management server 30 using electronic means such as email, text messages, web applications, facsimile, etc., via an appropriate communication device 41 of the remote gallery 40. In FIG. 2, the transmission of the purchase request is indicated by arrows C and D.

Pursuant to the purchase request, the remote gallery 40 ships the requested artwork to a physical shipping facility 50 of the clearinghouse system (step S38), which then ships it to the local gallery 30 that made the purchase request (step S39). In FIG. 2, the shipment of the artwork is indicated by arrows E and F. The shipping facility 50 of clearinghouse system may also perform additional functions such as inspecting the artwork, etc.

An order management system 51 (e.g. a computer), associated with the clearinghouse shipping facility 50, manages the fulfillment of the purchase request. For example, when an artwork is received from a remote gallery pursuant to a purchase request and has been inspected, an operator at the clearinghouse shipping facility 50 updates the order status in the order management server 51. The order management server 51 can automatically update the status of the request in the clearinghouse management server 30 (step S40). When the local gallery receives the artwork from the clearinghouse shipping facility 50, the local gallery notifies the clearinghouse management server 30 that the requested artwork is received (step S41). The clearinghouse management server 30 can automatically update the status of the request in the order management server 51 (step S42).

Further, the clearinghouse system maintains a suitable accounting and payment system (not shown in FIG. 2) to facilitate payment transactions. The accounting and payment system may be implemented on the clearinghouse management server 30, the order management server 51, or a separate server.

In lieu of a purchase request, the local gallery may also issue a "view" request, which is a request to view the actual artwork without a commitment to purchase it. A view request is handled by the clearinghouse management server 30 and the remote gallery 40 in a similar manner as a purchase request, except that after the actual artwork is received by the local gallery, the customer can view it and decide whether to purchase it or to return it to the remote gallery without a purchase.

In addition to the price request, purchase request and view request, a local gallery may also issue a "special request" when a customer inquires about a piece of art that is not already available in the clearinghouse system. Such a special request is transmitted to the clearinghouse management server 30 from the display device 21 at the local gallery. The clearinghouse management server 30 broadcasts the special request to all member galleries via electronic means, such as email, text message, facsimile transmission, etc. If a member gallery owns the artwork in question, it may respond to the special request, and the artwork will be entered into the clearinghouse system by an art input device and managed by the field management system in the manner described earlier.

In the above descriptions, the local galleries where the display devices 21 are located are preferably art galleries that own, display and sell actual artwork. In addition, the display devices 21 may also be used at art distribution points that have limited or no stock of actual artwork, so that customers can review works available within the clearinghouse system using the display device, and acquire actual artworks through the inter-gallery trading process described above. In this disclosure, the term art gallery covers such distribution points.

Further, the digital images of artworks stored in the central database 14 or the local storage 22 may be used to generate slide shows for display on the electronic display device 21 of the member galleries. The content of each slide show may be managed by the clearinghouse system, such as by the field management system 16, or managed by the member galleries where the display device 21 is located. In the latter case, the user interface of each display device 21 allows an operator to create and manage a slide shown on that device. Slide shows may also be displayed on large-format electronic display devices at desired locations not associated with member galleries, such as bank lobbies, hotel lobbies, etc. The content of such slide shows may be managed by the clearinghouse system, such as by the field management system 16.

The inter-gallery trading system shown and described above can be used to achieve other objectives related to trading of artworks. In one example, the clearinghouse system described above can be used to track histories of artworks. Each time an artwork is registered with the clearinghouse system by a member gallery or traded through the clearinghouse system, the price information for the artwork can be collected and stored by the clearinghouse management server 30. This information is accumulated over time, analyzed, and used to create a price index of artworks. For example, the price index may include, for each artwork, the metadata about the artwork, the date of each trade, the price, etc. The price index may be made available to users on a commercial (e.g. by subscription) or non-commercial basis, either online or via other electronic or non-electronic means such as CDs, books, etc. In addition, the price index may be made available to member galleries of the clearinghouse system through the display devices 21.

The system and method are described above in an example for trading artworks, but they can be used to trade other items generally categorized as collectors' items or collectible items, i.e., items that are unique or of limited supply. In the appended claims, the term "collectible items" broadly covers artworks and other collectible items. In addition, while the term "art gallery" is used above to describe embodiments of the present invention, in case of trading of other collectible items, galleries would be replaced by the places of business of traders of the collectible items.

It will be apparent to those skilled in the art that various modification and variations can be made in the inter-gallery art trading system and method of the present invention without departing from the spirit or scope of the invention. Thus, it is intended that the present invention cover modifications and variations that come within the scope of the appended claims and their equivalents.

What is claimed is:

1. A system for managing and trading a plurality of collectible items, comprising:

an image database storing digital image data representing the plurality of collectible items and metadata relating to the collectible items;

an electronic display device connected to the image database for displaying the digital image data and the metadata, the electronic display device implementing a user interface system for receiving user inputs;

a clearinghouse management computer remotely connected to the electronic display device; and a clearinghouse database connected to the clearinghouse management computer for storing price information for the plurality of collectible items, the clearinghouse database further storing association information that associates an information receiver device with each of a plurality of requesters, the information receiver device being different from the electronic display device;

wherein in response to a first user input, the electronic display device transmits a first request to the clearinghouse management computer, the first request being a request for price information for a specified one of the plurality of collectible items and identifying a requester of the first request, and wherein in response to receiving the first request from the electronic display device, the clearinghouse management computer automatically, without human intervention, transmits the price information for the specified collectible item to the information receiver device which is independent of the electronic display device and which is associated with the identified requester according to the stored association information, without transmitting any price information to the electronic display device in response to the first request.

2. The system of claim 1, wherein in response to a second user input, the electronic display device transmits a second request to the clearinghouse management computer, the second request being a request to physically obtain a specified one of the collectible items, wherein the clearinghouse database further stores source information which identifies a source of each of the plurality of collectible items, and wherein in response to receiving the second request from the electronic display device, the clearinghouse management computer identifies a source of the specified collectible item based on the source information stored in the clearinghouse database, and transmits a third request to the source to physically obtain the collectible item.

3. The system of claim 2, further comprising an order management system connected to the clearinghouse management computer for updating a status of the second request.

4. The system of claim 1, further comprising:

a digital image capturing device for generating raw digital image data representing the collectible items;

a data processing system for digitally processing the raw digital image data to generate the digital image data; and a central database for storing the digital image data and the metadata relating to the collectible items, wherein the image database connected to the electronic display device is a local database generated from the central database.

5. The system of claim 1, wherein the electronic display device is a large format touch screen panel, the electronic display device implementing a graphical user interface system for receiving user inputs via the touch screen.

6. The system of claim 1, wherein the electronic display device includes one or more security devices for controlling access to the electronic display device.

7. A method for managing and trading a plurality of collectible items, comprising:

storing in an image database digital image data representing the plurality of collectible items and metadata relating to the collectible items;

displaying the digital images representing the collectible items and the metadata on an electronic display device connected to the image database;

in response to a first user input, the electronic display device transmitting a first request to a clearinghouse management computer remotely connected to the electronic display device, the first request being a request for price information for a specified one of the collectible items;

storing in a clearinghouse database connected to the clearinghouse management computer price information for each of the plurality of collectible items;

storing association information that associates an information receiver device with each of a plurality of requesters, the information receiver device being different from the electronic display device; and in response to receiving the first request from the electronic display device, the request identifying a requester of the first request, the clearinghouse management computer automatically, without human intervention, transmitting the price information for the specified collectible item to the information receiver device which is independent of the electronic display device and which is associated with the identified requester according to the stored association information, without transmitting any price information to the electronic display device in response to the first request.

8. The method of claim 7, further comprising:

in response to a second user input, the electronic display device transmitting a second request to the clearinghouse management computer, the second request being a request to physically obtain a specified one of the collectible items;

storing in the clearinghouse database source information which identifies a source of each of the plurality of collectible items; and in response to receiving the second request from the electronic display device, the clearinghouse management computer identifying a source of the requested collectible item based on stored source information and transmitting a third request to the source to physically obtain the specified collectible item.

9. The method of claim 8, further comprising updating a status of the second request.

10. The method of claim 7, further comprising:

generating raw digital image data representing the collectible items using a digital image capturing device;

digitally processing the raw digital image data to generate the digital image data; and storing the digital image data and the metadata relating to the collectible items in a central database, wherein the image database is a local database generated from the central database.

11. A clearinghouse system for managing and trading a plurality of collectible items, comprising:

a clearinghouse management computer remotely connected to a plurality of electronic display devices; and a clearinghouse database connected to the clearinghouse management computer, the clearinghouse database storing price information for each of the plurality of collectible items and association information that associates an information receiver device with each of a plurality of requesters, the information receiver device being different from the electronic display devices, wherein in response to receiving a first request from one of the electronic display devices, the first request being a request for price information for a specified collectible item and further identifying a requester, the clearinghouse management computer automatically, without human intervention:

obtains the price information for the specified collectible item and the stored association information for the identified requester from the clearinghouse database, obtains the information receiver device associated with the identified requester from the stored association information, and transmits the price information to the information receiver device without transmitting any price information to the one of the electronic display devices in response to the first request; the information receiver device being associated with the identified requester according to the stored association information and is independent of the one of the electronic display devices.

12. The system of claim 11, wherein the clearinghouse database further stores source information which identifies a source of each of the plurality of collectible items, and wherein in response to receiving a second request from one of the electronic display devices, the second request being a request to physically obtain a specified collectible item, the clearinghouse management computer identifies a source of the specified collectible item based on the stored source information, and transmits a third request to the source to physically obtain the collectible item.

13. The system of claim 12, further comprising an order management system connected to the clearinghouse management computer for updating a status of the second request.

* * * * *